United States Patent [19]
Slater et al.

[11] 4,453,988
[45] Jun. 12, 1984

[54] COATINGS FOR RUSTED METALLIC SURFACES

[75] Inventors: William Slater; Michael Kenny, both of Louisville, Ky.

[73] Assignee: Grow Group, Inc., Louisville, Ky.

[21] Appl. No.: 457,399

[22] Filed: Jan. 12, 1983

[51] Int. Cl.$^3$ .............................................. C23F 9/00
[52] U.S. Cl. ........................... 148/6.14 R; 427/388.1; 427/388.2; 427/290; 428/461; 428/462; 428/463; 428/521; 428/522
[58] Field of Search ............... 148/6.14 R; 427/388.1, 427/388.2, 290; 428/461, 462, 463, 521, 523

[56] References Cited

U.S. PATENT DOCUMENTS

| 4,086,182 | 3/1978 | Hengalaupt | 148/6.14 R |
| 4,107,156 | 8/1978 | Sunamori | 427/340 |
| 4,234,711 | 11/1980 | Emmons | 427/388.1 |
| 4,311,624 | 1/1982 | Emmons | 427/388.2 |
| 4,326,888 | 4/1982 | Frew | 428/461 |

Primary Examiner—Sam Silverberg
Attorney, Agent, or Firm—Donald L. Cox

[57] ABSTRACT

A method is disclosed for coating rusted metallic surfaces which comprises (a) removing loose rust particles by superficial surface treatment, (b) applying a coating containing about 55–95% by weight of an aliphatic(-meth)acrylic monomer having at least two sites of polymerizable unsaturation and having a 25° C. vapor pressure of no greater than about 0.5 mmHg and a 25° C. viscosity in the range of about 3 cps to about 100 cps, about 0.5–5.0% by weight of a peroxide curing system and about 5.0–35.0% by weight of a drying oil-based oxygen scavenger system, and (c) allowing the coating to cure under ambient conditions.

7 Claims, No Drawings

COATINGS FOR RUSTED METALLIC SURFACES

BACKGROUND OF INVENTION

This invention relates to coating compositions. More particularly, this invention relates to coating compositions applicable to rusted metallic surfaces.

The recoating of iron-containing metallic surfaces which have become rusted has been expensive and time-consuming. This is particularly true where extensive rusting of the metallic substrate has occurred. In the prior art, before repainting, it was required that such a surface be sandblasted or otherwise subject to a complicated, expensive and time-consuming rust removal process.

The preparation of air dryable curable coating compositions employing dicyclopentadiene methacrylate copolymers is known. See, for example, U.S. Pat. No. 4,100,133 and U.S. Pat. No. 4,303,563. Moreover, in the '133 patent, the use of volatile oxime stabilizers and polyvalent metal-containing complexes or salts for catalysts is also disclosed. However, in neither of these patents is it disclosed that the monomers described herein, without polymerization, may be applied to a rusted metallic surface and used as protective coatings.

Thus, it is an object of this invention to prepare coating compositions which may be applied over rusted surfaces with a minimum of surface preparation.

It is another object of this invention to prepare coating compositions which may be applied to densely rusted surfaces without the necessity of the extensive pretreatment of the metallic substrate.

In addition, it is an object of this invention to prepare coating compositions which do not evaporate extensively after application, are not toxic, and do not possess an unpleasant odor.

These and other objectives are obtained by preparing the coating compositions of the instant invention, and by employing the methods further described hereafter.

SUMMARY OF INVENTION

Basically, the instant invention involves a method for coating rusted metallic substrata and to the coating compositions useful for coating these rusted substrata.

The coating method involves removing loose rust from the substrate by superficial surface treatment, such as scraping, wire brushing, or high pressure water washing. Subsequently, the substrate is treated with a coating composition which contains from about 55.0–95.0% by weight based on the total coating composition of an aliphatic (meth)acrylic monomer having a 25° C. vapor pressure of no greater than about 0.5 mmHg and a 25° C. viscosity in the range of about 3 cps to about 100 cps, about 0.5–5.0% by weight on the same basis of a peroxide curing system, and about 5.0–35.0% by weight on the same basis of a drying oil-based oxygen scavenger. These coatings when allowed to cure under ambient conditions are tough and adherent and protect the metallic substrata from further rusting or corrosion.

DETAILED DESCRIPTION OF INVENTION

As pointed out above, the instant invention involves a method of treating rusted metallic surfaces. In addition, this invention involves particular compositions which may be employed in carrying out this process.

The method itself is simple to use and inexpensive. In the prior art, before a ferrous metallic substrate which had rusted could be coated, it was necessary that the substrate be treated so as to remove virtually all of the iron oxide buildup on the surface. Particularly with surfaces which had been extensively rusted, it was usually necessary to sandblast the surface to remove all of the iron oxide which had formed. Sandblasting, however, is time-consuming and expensive, and in addition, poses serious health threats for exposed workers. In the instant invention it is unnecessary that all surface rust be removed before the coating is applied. Rather, the coating is applied directly over the rusted metal. The only requirement is that surface iron oxide scale be removed, for example, by superficial scraping, wire brushing or by the application of a high pressure water wash treatment. It is necessary to perform this step so that loose scales are not covered by the coating of the instant invention. However, once these scales have been removed, the coating of the instant invention may be applied to any substrate which has a relatively uniform rusted surface.

Although the inventors do not wish to be limited by any particular theory, they believe that the iron oxide on the surface of the metalic substrate coated by their process is actually captured by the coating vehicle forming in situ iron oxide pigmentation for the coating system.

In any event, the coating compositions of the instant invention are applied to the rusted substrate by any conventional method, including brushing, spraying, dipping or roller coating. The compositions of this invention may be applied under virtually any ambient conditions. Cure periods for the coatings range from about three to about 24 hours, depending upon ambient conditions of temperature and humidity. Generally the coatings of the instant invention, after curing, will penetrate up to ¼ inch or more of rust to provide a hard, adhesive coating which is difficult to remove even if scraped with a knife.

In addition, the coatings of the instant invention surprisingly act to displace water which is present on the surface of the rusted metallic substrate. With prior art systems, in order to obtain an adherent coating, it was necessary that the substrate to be coated be dried to remove virtually all surface water. However, the coatings of the instant invention require no such drying step. Rather, as the coatings are applied to a wet surface, the coatings themselves displace any water which is present. After application of the coating, the displaced water is seen in rivulets running down the surface of the coated substrate.

The amount of the coating of the instant invention which need be applied varies, depending upon a large number of factors, including the thickness of the end use coating which is needed, and the amount of rust which is present. Where thicker films are required, it may be necessary to apply multiple coatings of the compositions of the instant invention. In general, coatings having thicknesses of from about 0.3 mils to about 1.0 mils or higher may be obtained. Usually the thickness of any single coating cannot exceed about 1.5 mils because of the low viscosity of the products prepared herein.

There are three main components of the instant invention. The first is a polyunsaturated material having at least two sites of 1,2 polymerizable unsaturation and containing either dicyclopentadiene rings or acrylic or methacrylic unsaturated groups or combinations of both. The second compartment of the instant invention is a peroxide curing agent along with a catalyst therefor, and the third component is a drying oil-based oxygen scavenger system.

The polyunsaturated monomer, as pointed out above, must have at least two sites of polymerizable unsaturation. These sites may be furnished by acrylic or methacrylic groups. In addition, the monomers should exhibit a vapor pressure of less than 0.5 mmHg. Monomers which have a vapor pressure in excess of this evaporate too quickly to be useful for the coatings herein. In addition, the monomers should exhibit a viscosity in the range of about 3–100 cps, preferably about 3 to about 50 cps. Monomers with higher viscosities will not sufficiently penetrate into the rusted surface to allow the formation of a coating having adequate film properties. Lower viscosity monomers are preferred, since they penetrate the rusted substrate more effectively than do higher viscosity monomers. However, the use of multiple coats may be required before sufficient film build is obtained.

In general the monomers of the instant invention are poly(meth)acrylates based upon either dicyclopentadiene or alkyl polyols or polyol ethers. Examples of the monomers falling within the above description include tetraethylene glycol diacrylate, hexanediol diacrylate, tripropylene glycol diacrylate, dicyclopentadiene methacrylate, dicyclopentadiene acrylate, dicyclopentadiene alkoxy acrylate or methacrylate, including dicyclopentadiene ethoxy methacrylate, and trimethylolpropane triacrylate. Preferred among these materials are dicyclopentadiene methacrylate, dicyclopentadiene acrylate, and dicyclopentadiene alkoxy acrylates or methacrylates with the ethoxy methacrylate being the most preferred in this latter group. The preparation and use of these latter materials is further described in U.S. Pat. No. 4,100,133, which is incorporated by reference herein.

The compositions of the instant invention may also be modified with minor amounts, up to about 40% by weight, based on the total monomer weight, of a mono-unsaturated monomer compatible with the polyunsaturated monomers described above. Examples of these materials include materials such as styrene, vinyl toluene and the various mono-acrylate and methacrylate monomers, including the $C_1$–$C_8$ alkyl acrylate and methacrylates, as well as the various hydroxy alkyl acrylates and methacrylates. Of particular importance in this latter group of monomers are the hydroxy alkyl acrylates and methacrylates, such as the hydroxy ethyl and hydroxy propyl acrylates and methacrylates.

The instant invention employs a catalyzed peroxy system. As used herein, the use of this term does not mean that the peroxygen compound and its catalyst are mixed together. Rather, both components are added to the compositions of the instant invention, preferably separately from one another. If the two materials are mixed together, catalytic effects are lost and there is a danger of rapid heat buildup and even fire or explosion. Virtually any peroxide-containing or -generating material may be used in the instant invention. These materials are well known in the art. However, specific materials include benzoyl peroxide, cumene hydroperoxide, dicumylperoxide, methylethyl ketone peroxide, tertiary butyl hydroperoxide, 2,4-pentanedione, lauroyl peroxide, acetyl peroxide, 2,4-dichlorobenzoyl peroxide, and the like, as well as materials such as 2,4-mercaptobenzothiazole.

The catalyst for the peroxide system may include a polyvalent metal, metal complex or salt, typical of the type used to catalyze the oxygen curing of drying oils or drying oil-modified alkyl resins. Examples of such materials include zinc, copper, magnesium, lead, cobalt, calcium, iron and zirconium. The materials may be used alone or in their salt or organic complex form. Examples of the salts useful are those derived from halides, including chlorides, nitrates and sulfates. Also useful are the organic acid salts, such as the acetates, propionates, butyrates and the like. The complex reaction products of metal oxides, acetates, borates or vegetable oils are also useful. Other useful materials include the metal salts of naphthenic acid or $C_8$–$C_{30}$ aliphatic acids. These material are further described in U.S. Pat. No. 4,100,133, which is incorporated herein by reference.

In order to promote package stability and extend pot life a volatile ketone-oxime (ketoxime) or aldehyde-oxime (ald-oxime) which forms a complex with the metal or the polyvalent metal-containing complex is added. In general, oximes of any ketone, having from 3 to 10 carbon atoms, preferably those in which the substituents on the keto-carbon atom are selected from alkyl groups and saturated alicyclic groups, and oximes of any aldehyde, preferably a saturated aliphatic aldehyde, having from 1 to 10 carbon atoms have sufficient volatility to assure rapid autoxidation upon forming the coatings of the invention. Examples of these oximes are methyl ethyl ketone-oxime, methyl butyl ketone-oxime, 5-methyl-3-heptanone-oxime, cyclohexanone-oxime, and butyaldehyde-oxime.

The oxime should be added in amounts ranging up to about two percent based upon the weight of the monomer, preferably up to about one percent.

The third essential component of the instant invention is a drying oil based oxygen scavenger system. Examples of such materials include mixtures of drying oils or modified drying oils. Examples of the drying oils include linseed, tung, fish, oiticica, soya, dehydrated castor and the like. Modifications of the drying oils may range from the formation of alkyd type resins by reaction with polyols and polybasic acids to urethane or acrylic modifications, all well known in the art. The most preferred scavengers are the urethane modified oil-based fatty acid materials prepared by reacting a drying oil fatty acid, such as linseed fatty acid, with a diisocyanate such as toluene diisocyanate. These materials may also be prepared by reacting partially or fully alcoholized oil or hydroyl-containing oils with a polyisocyanate using known methods.

The compositions of the instant invention may be compounded into one- or two-package systems. If a one package system is employed it must be used immediately. However, two-package systems may be prepared which, for example, involve in separate packages mixing on the one hand the monomer, catalyst for the peroxide and oxime, and in the second package the oil-modified urethane and the peroxide. These latter two-package compositions are stable for long periods of time.

The compositions of the instant invention may be compounded with various fillers, reinforcing agents, pigments and the like, as long as such compounding does not substantially effect the viscosity requirements imposed above. As pointed out previously, system viscosity must be maintained at a low level in order to allow penetration of the rust coating and to facilitate curing.

In the following examples, all parts and percentages are by weight, unless otherwise indicated:

EXAMPLE 1

The following ingredients were mixed: 79.0 parts of dicyclopentadiene methacrylate, 1.9 parts of 6% cobalt naphthanate, and 17.5 parts of Spenkel F35-100, a 100% solids oil-modified urethane resin available from Spencer Kellogg Textron, Inc. having a Gardner Holdt 25° C. viscosity of $Z_4+$, an acid value of 0.8 and a weight per gallon of 8.14 lbs. These materials were mixed and 1.6 parts of 9% methylethyl ketone peroxide were added to the mixture.

EXAMPLE 2

Utilizing essentially the same procedures as described in Example 1, a coating mixture was obtained by replacing the dicyclopentadiene methacrylate in Example 1 with dicyclopentadiene ethoxy methacrylate on a weight-for-weight basis.

EXAMPLE 3

Utilizing essentially the same procedures as described in Example 1, a coating mixture was obtained by replacing the dicyclopentadiene methacrylate monomer with dicyclopentadiene acrylate on a weight-for-weight basis.

EXAMPLE 4

Utilizing essentially the same procedures as described in Example 1, a coating mixture mixture was obtained by replacing the dicyclopentadiene methacrylate with tetraethylene glycol diacrylate on a weight-for-weight basis.

EXAMPLE 5

Utilizing essentially the same procedures as described in Example 1, a coating mixture was obtained by replacing the dicyclopentadiene methacrylate with trimethylolpropane triacrylate on a weight-for-weight basis.

EVALUATION OF EXAMPLES 1-5

The above examples were applied to rusty surfaces and cured for 8 hours. The mixtures specified above all had pot lives in the range of 0.5 to 2.0 hours. After curing the resulting coatings were hard and difficult to remove even with a steel knife blade.

EXAMPLE 6

Example 2 was repeated, except that the methyl ethyl ketone peroxide was replaced on a weight-for-weight basis with a 50% benzoyl peroxide solution.

EXAMPLE 7

Example 2 was repeated, except that the methyl ethyl ketone peroxide was omitted. The coating was allowed to cure through autoxidation.

CURING AND EVALUATION OF EXAMPLES 6 AND 7

Cured films were prepared from Examples 6 and 7 by spraying a coating of the various materials to rusty panels and allowing the coating to cure at room temperature for 24 hours. The resulting coating was hard and adherent.

In addition, sandblasted steel panels were coated with from 0.5 to 1.0 mil of the test material in order to obtain a controlled comparison of the adhesion and corrosion resistance of the various coatings. While still wet the coated panels were placed in a condensing humidity environment. Corrosion resistance was determined by ascertaining the total number of days required for spot rusting to develop. Among the various coatings, Example 6 exhibited better corrosion, requiring three to four days to produce spot rusting, while Examples 2 and 7 exhibited spot rusting after approximately twenty-four hour's exposure.

EXAMPLE 8

Example 2 was repeated except that the oil-modified urethane resin was replaced with linseed oil on a weight-for-weight basis.

EXAMPLE 9

Example 8 was repeated except that the linseed oil was replaced on a weight-for-weight basis with linseed fatty acid.

CURING AND EVALUATION OF EXAMPLES 2, 8 AND 9

Each of the above formulations cured at room temperature. However, Example 2 showed improved corrosion resistance and cure under high humidity or low temperature conditions when compared to Examples 8 and 9 using the procedure specified under the Curing and Evaluation of Examples 6 and 7.

EXAMPLE 10

A two-package curing system was prepared by mixing 78.9 parts of dicyclopentadiene ethoxy methacrylate, 1.9 parts of 6% cobalt naphthanate, and 1.0 part of MEK Oxime. The second package of the system was prepared by mixing 17.2 parts of an oil-modified urethane, 1.7 parts of a 50% benzoyl peroxide solution, and 0.2 part of methylethyl ketone oxime. These materials separately were stable for a minimum of 6 months, and exhibited a pot life of 24 hours at 100° F. when mixed. The material cured into a thin film (1–1.5 mil) after 18–24 hours at room temperature.

Numerous changes may be made in the practice of the above invention without departing from its scope.

What is claimed is:

1. A method of coating a rusted metallic surface comprising (a) removing loose rust particles by superficial surface treatment and (b) applying a coating for rusted metal, comprising about 55–95% by weight based on the total coating weight of a poly(meth)acrylic monomer selected from dicyclopentadiene acrylate or methacrylate, dicyclopentadiene alkoxy acrylate or methacrylate, polyacrylates of alkyl polyols or alkyl ether polyols, and polymethacrylates of alkyl polyols or allyl ether polyols having a vapor pressure no greater than about 0.5 mmHg and a viscosity in the range of about 3–100 cps, about 0.5–5.0% by weight on the same basis of a peroxide system, and about 5.0–35.0% by weight on the same basis of a drying oil-based oxygen scavenger system.

2. The method of claim 1 wherein the rust is removed by wire brushing, scraping, or high pressure water.

3. The method of claim 1 wherein the oxygen scavenger is based upon drying oils or drying oil-based fatty acids.

4. The method of claim 3 wherein the oxygen scavenger is a drying oil-modified polyurethane.

5. The method of claim 1 wherein the coating contains up to about 2% by weight of an oxime, based on the total monomer weight.

6. The method of claim 1 wherein the coating comprises in one package a mixture of the monomer and the catalyst for the peroxide and in a separate package the peroxide and the drying oil-based oxygen scavenger.

7. The method of claim 1 wherein the polyunsaturated material is selected from dicyclopentadiene methacrylate, dicyclopentadiene acrylate, and dicyclopentadiene ethoxy methacrylate.

* * * * *